Jan. 11, 1966     G. T. KERR     3,228,969
PROCESS FOR SYNTHESIZING A METHYLAMMONIUM CRYSTALLINE ZEOLITE
Filed April 30, 1962
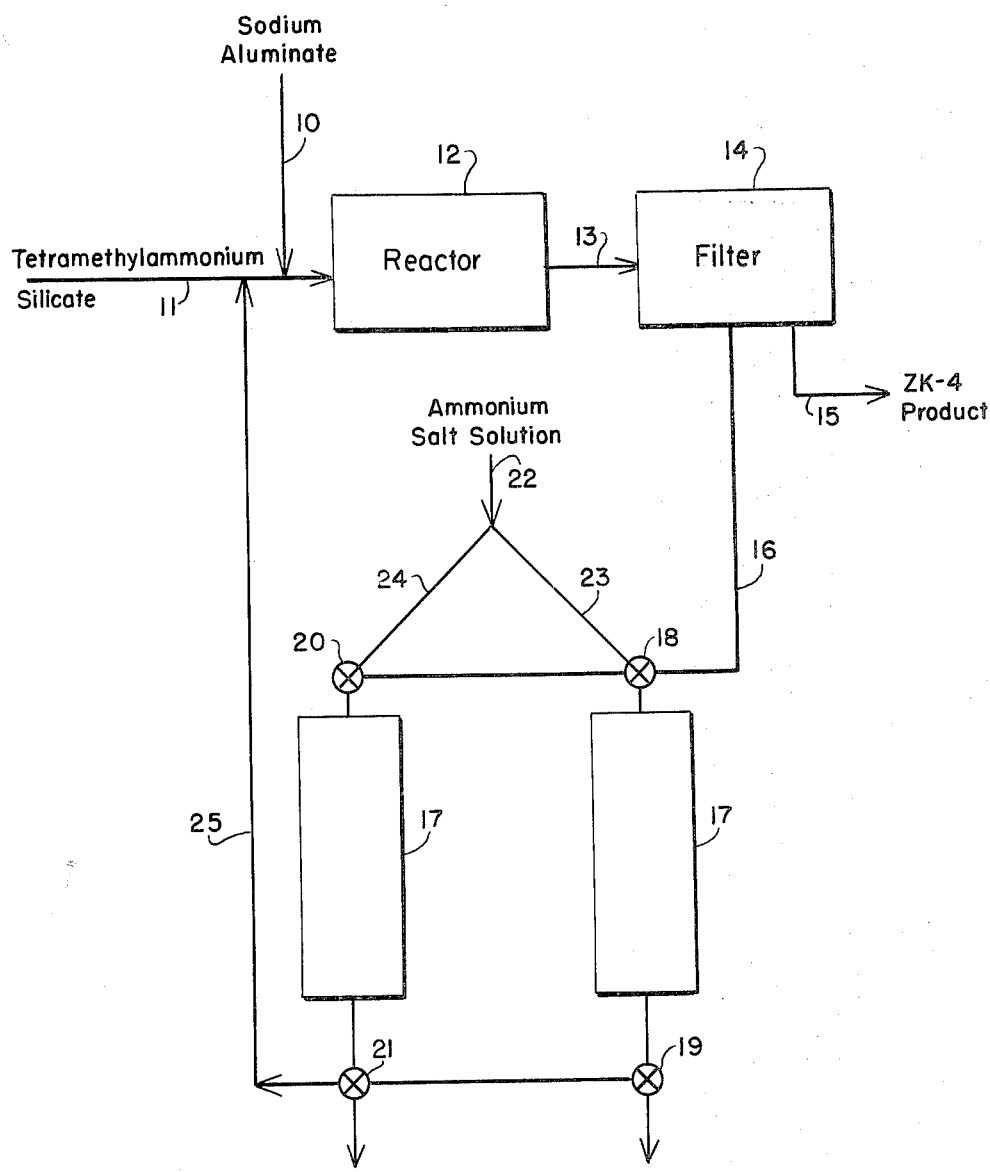
INVENTOR.
George T. Kerr
by Raymond W. Barclay
ATTORNEY.

3,228,969
PROCESS FOR SYNTHESIZING A METHYL-
AMMONIUM CRYSTALLINE ZEOLITE
George T. Kerr, Cherry Hill Township, Camden County,
N.J., assignor to Socony Mobil Oil Company, Inc., a
corporation of New York
Filed Apr. 30, 1962, Ser. No. 190,855
3 Claims. (Cl. 260—448)

This application is a continuation-in-part of copending application Serial No. 134,841, filed August 30, 1961.

This invention relates to an improved method for synthesizing zeolites. More particularly, the present invention is directed to an improvement in the preparation of zeolite ZK–4, described in my above mentioned copending application.

The composition of zeolite ZK–4 can stoichiometrically be expressed, in terms of mole ratios of oxides, as follows: 0.1 to 0.3R:0.7 to $1.0X_2O:1\ Al_2O_3:2.5$ to 4.0 $SiO_2 \cdot YH_2O$ where R is selected from the group consisting of a methyl ammonium oxide, hydrogen oxide and mixtures thereof with one another; X is selected from the group consisting of sodium and potassium and Y is any value from about 3.5 to about 5.5, said material being capable of selectively sorbing straight chain hydrocarbons of more than three carbon atoms from admixture of the same with non-straight chain hydrocarbons when X is sodium and capable of selectively sorbing water from admixture of the same with straight chain molecules having more than three atoms in the chain when X is potassium. Minor variations in the mole ratios of these oxides within the range indicated by the above formula do not significantly change the crystal structure or physical properties of the zeolite.

Zeolite ZK–4, as described in my aforenoted copending appliaction, is prepared from reaction mixtures containing a tetramethylammonium ion and more specifically, by heating in aqueous solution a mixture of the oxides or of materials whose chemical compositions can be completely represented as mixtures of the oxides of $Na_2O$, $Al_2O_3$, $[(CH_3)_4N]_2O$, $SiO_2$ and $H_2O$ suitably at a temperature between about 20 and 120° C. and preferably at about 100° C. for periods of time ranging from 15 minutes to 90 hours or longer. The product which crystallizes from the hot reaction mixture is separated, suitably by centrifuging or filtration, washed with water until the effluent wash water in equilibrium with the zeolite has a pH of from about 9 to 12. The material, so obtained, is thereafter activated by heating in an inert atmosphere at a temperature in the approximate range of 200 to 600° C.

In making zeolite ZK–4, the usual method comprises reacting, in aqueous media sodium aluminate or an amorphous sodium aluminosilicate gel with tetramethylammonium silicate, or tetramethylammonium disilicate pentahydrate in a solution of tetramethylammonium hydroxide. Alternatively, an amorphous sodium aluminosilicate gel having a high silica to alumina ratio, i.e. greater than about 2.5, may be reacted in aqueous media with tetramethylammonium hydroxide solution. The reaction is carried out in a suitable vessel made, for example, of metal or glass and capable of closure to prevent loss of water. The reaction mixture is initially continuously or periodically stirred to insure homogeneity. After this mixing, agitation may be stopped as it is unnecessary to agitate the reaction mass during the formation and crystallization of the zeolite, although mixing during such latter stages has not been found to be detrimental.

The crystallization procedures can be satisfactorily carried out at temperatures within the range of from about 100° C. to about 120° C., the pressure being atmospheric or at least that corresponding to the vapor pressure of water in equilibrium with the mixture of reactants. While temperatures as low as about 20° C. may be employed, such lower temperatures require a long reaction time. Preferably, a temperature of approximately 100° C. is employed. Heating is continued until the desired crystalline zeolite product is formed. The zeolite crystals are then separated from the mother liquor and washed, preferably with distilled water, until the effluent wash water in equilibrium with the product has a pH of between about 9 and about 12.

For satisfactory use as an adsorbent, zeolite ZK–4 should be activated by at least partial dehydration. Such activating can be effected, for example, by heating the zeolite to temperatures within the approximate range of 200 to 600° C. in an inert atmosphere, such as air or nitrogen, under atmospheric or reduced pressure, or by maintaining the zeolite at room temperature under vacuum.

In the synthesis of zeolite ZK–4, it has been found that the composition of the reaction mixture is critical. Specifically, the presence in such mixture of tetramethylammonium ions has been found to be essential for the production of zeolite ZK–4. In the absence of such ions, no zeolite ZK–4 was obtained. The crystallization temperature and the length of time the crystallization temperature is maintained are important variables in determining the yield of crystalline material.

The resulting crystalline synthetic aluminosilicate zeolite is one having the negative electrovalence of the aluminosilicate balanced by a cation consisting essentially of about 80 to about 90 percent sodium oxide and about 10 to about 20 percent of a methyl ammonium oxide, which zeolite is further characterized by a uniform effective pore diameter of about 5.5 angstroms. When potassium is substituted for sodium the uniform effective pore diameter is reduced to below about 5 angstroms.

Sodium oxide present in the reaction mixture may be derived from sodium aluminate or an amorphous sodium aluminosilicate gel. The latter is characterized by the following composition:

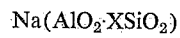

$$Na(AlO_2 \cdot XSiO_2)$$

where X is a number in the approximate range 0.5 to 20. This material may be prepared by reaction of ethyl orthosilicate and sodium aluminate. Silica present in the reaction mixture may be derived from a variety of sources, for example, silica gel, silica hydrosol and silicate esters. At the time of mixing with sodium aluminate, however, at least a portion of the silica should be solubilized in the form of tetramethylammonium silicate.

Zeolite ZK–4, as above prepared, generally contains sodium as a cation. Such ion can be partially or completely replaced with other cations, including monovalent or divalent cations, such as lithium and magnesium, metal ions in Group I of the Periodic Table such as potassium and silver; Group II metal ions such as calcium and strontium; metal ions of the transition metals such as nickel, the rare earth metals such as cereium, lanthanum, praseodymium, neodymium, samarium and mixtures thereof with each other and the other rare earths; and other ions, for example hydrogen and ammonium which behave in zeolite ZK–4 as metals in that they can replace metal ions without causing any appreciable change in the basic structure of the zeolite crystal. The transition metals are those whose atomic numbers are from 21 to 28, from 39 to 46 and from 72 to 78 inclusive, namely, scandium, titanium, vanadium, chromium, manganese, iron, cobalt, nickel, yttrium, zirconium, niobium, molybdenum, ruthenium, rhodium, palladium, platinum, hafnium, tantalum, tungsten, rhenium, osmium and iridium.

The unit cell formula for a typical dehydrated zeolite ZK-4 is:

$$Na_{7.5\pm 2}H_{2\pm .5}[9\pm 2Al_2O_3 \cdot 15\pm 2SiO_2]$$

The X-ray powder diffraction pattern has been found useful in further identification. X-ray diffraction powder patterns of zeolize ZK-4 have been obtained utilizing standard techniques. The radiation was the $K_\alpha$ doublet of copper and a Geiger counter spectrometer with a strip chart pen recorded was used. The peak heights, I, and the positions as a function of $2\phi$, where $\phi$ is the Bragg angle, were read from the spectrometer chart. From there, the relative intensities, $$\frac{100\,I}{I_0}$$

where $I_0$ is the intensity of the strongest line or peak and $d$ (obs), the interplanar spacing in A, corresponding to the recorded lines were calculated. X-ray powder diffraction data for zeolite ZK-4 is set forth hereinbelow.

TABLE I

| $d$(A.) | $I/I_0 \times 100$ | $d$(A.) | $I/I_0 \times 100$ |
| --- | --- | --- | --- |
| 12.08 | 100 | 2.225 | 2 |
| 9.12 | 29 | 2.159 | 4 |
| 8.578 | 73 | 2.121 | 5 |
| 7.035 | 52 | 2.085 | 2 |
| 6.358 | 15 | 2.061 | 2 |
| 5.426 | 23 | 2.033 | 5 |
| 4.262 | 11 | 1.90 | 2 |
| 4.062 | 49 | 1.880 | 2 |
| 3.662 | 65 | 1.828 | 1 |
| 3.391 | 30 | 1.813 | 1 |
| 3.254 | 41 | 1.759 | 1 |
| 2.950 | 54 | 1.735 | 1 |
| 2.725 | 10 | 1.720 | 5 |
| 2.663 | 7 | 1.703 | 1 |
| 2.593 | 15 | 1.669 | 2 |
| 2.481 | 2 | 1.610 | 1 |
| 2.435 | 1 | 1.581 | 2 |
| 2.341 | 2 | 1.559 | 1 |

In accordance with the present invention, zeolite ZK-4, prepared as described above, is removed after crystallization from its mother liquor. The residual mother liquor containing sodium, tetramethylammonium, silicate and hydroxide ions is desirably used for further zeolite ZK-4 preparation. It has been found, however, that for each successive preparation the sodium/tetramethylammonium ion ratio of the aqueous phase is increased and that such ratio eventually reaches a value which results in the formation of a zeolite or zeolites other than the desired zeolite ZK-4.

It is a major object of the instant invention to overcome the aforenoted problem. Such object is achieved, following the teachings of this invention, by bringing the above described mother liquor into contact with a zeolite having uniform pore openings of less than 6 angstrom units, the replaceable ion of which is selected from the group consisting of hydrogen and ammonium ions. Upon effecting such contact, sodium ions contained in the mother liquor pass readily through the pore openings of the zeolite, displacing the cations thereof, i.e. hydrogen or ammonium ions. There is thus achieved an exchange of the sodium ions in the mother liquor and the hydrogen or ammonium ions of the zeolite. Presence of the latter ions in the mother liquor has not been found to interfere with the formation of zeolite ZK-4 of high purity. In addition, the ammonium ion, in the presence of the strongly caustic quaternary ammonium silicate solution, decomposes into gaseous ammonia which escapes from the reaction mixture at 100° C. The tetramethylammonium ion contained in the mother liquor and having a diameter of 6.3 A. is, on the other hand, too large to enter the pores of the zeolite. There is thus effected selective withdrawal from the mother liquor in question of an ion which adversely affects the use of such liquor in further synthesis of zeolite ZK-4 and the selective replacement of such ion with another ion which has not been found to so interfere.

The mother liquor after the foregoing treatment may be effectively employed in further preparation of zeolite ZK-4 by reaction with sodium aluminate or an amorphous sodium aluminosilicate gel, such as utilized in the initial preparation of such zeolite. If necessary or desirable, the treated mother liquor may be replenished with silica before being used in further preparation of zeolite ZK-4.

It is contemplated that contact of the mother liquor, resulting from zeolite ZK-4 preparation and the zeolite for removal of sodium ion from such liquor may be effected over a wide range of temperatures and pressures. Thus, contact may be generally carried out at a temperature between the freezing point and boiling point of the solution. Likewise, the pressure during such contact should be such that no substantial loss of solvent is encounted and that the solution does not solidify.

The zeolites employed herein for removal of the sodium ion are characterized by two essential properties. These are: (1) a uniform structure of pores, the diameter of which do not exceed 6 angstroms and (2) a replaceable cation of hydrogen, ammonium or mixtures thereof with one another. Preferably, the pore diameter of the zeolite utilized for sodium removal is within the range of 3 to 6 angstroms and is in the ammonium form. Zeolites fulfilling the foregoing prerequisites include, by way of example, the hydrogen or ammonium form of Zeolite A, described in U.S. 2,882,243; Zeolite B, described in U.S. 3,008,803; Zeolite ZK-4, described in copending application Serial No. 134,841 filed August 30, 1961; Zeolite ZK-5, described in copending application Serial No. 174,718, filed February 21, 1962; natural mordenite, chabazite and certain ion exchange resins with relatively high degrees of cross-linking.

It will be understood that after the zeolite of the foregoing type has been used for sodium removal, it is in the sodium form and is necessarily subject to regeneration by exposure to hydrogen or ammonium ions before further application in the treatment of zeolite ZK-4 mother liquor.

The method described hereinabove may suitably be carried out on a batch or continuous basis. A system, in highly schematic form, for carrying out such method is shown in the attached figure. Referring more particularly to this figure, suitable reactants, for example, sodium aluminate and tetramethylammonium silicate are introduced by way of lines 10 and 11 respectively to reactor 12 maintained preferably at a temperature of 100° C.–120° C. Zeolite crystals formed are conducted as a slurry in the mother liquor through line 13 into filter 14. The zeolite ZK-4 product is removed by line 15 and is thereafter washed and subjected to thermal activation by means not shown. The filtrate, containing sodium, tetramethylammonium, silicate and hydroxide ions, is conducted through line 16 to a series of exchangers 17, containing a hydrogen or ammonium zeolite characterized by a uniform structure of pores less than 6 A. in diameter. By suitable control of valves 18, 19, 20 and 21, the filtrate passes alternately through one of the exchangers and then the other with intermediate regeneration of the spent zeolite with a solution containing the approximate cation, for example, an ammonium salt solution flowing through line 22 and lines 23 and 24 alternately to revivify the adsorbent zeolite. The solution resulting from such operation, freed of sodium ions, is then recycled through line 25 to line 11 along with added sodium aluminate and such amount of tetramethylammonium silicate as may be warranted to maintain the requisite ratios of reactants.

It has been found feasible in determining the purity of zeolite ZK-4 to examine the sorptive capacity thereof and particularly the capacity for the adsorption of n-hexane.

The following examples will serve to illustrate the method and advantages of the invention without limiting the same:

Example 1

Zeolite ZK-4 was prepared using 17.25 grams of sodium aluminate dissolved in 50 ml. of water and 46 grams of silica gel dissolved in 310 ml. of 2.47 N tetramethylammonium hydroxide solution. About .2 gram of zeolite ZK-4 was added as seed. After 24 hours of reaction time at 100° C. the mixture was filtered. The filtrate was set aside for analysis. The zeolite product was washed with water and purged at 350° C. with air. The resulting activated zeolite sorbed 23.54 grams of water per 100 grams of sample; 11.52 grams of n-hexane per 100 grams of sample and 0.41 gram of cyclohexane per 100 grams of sample. These sorptive capacities are typical of zeolite ZK-4.

Analysis of the filtrate from this initial preparation of zeolite ZK-4 indicated that it was 2.52 N solution as a base and contained 1.255 millimoles of $SiO_2$ per ml. On the basis that all of the basic cation was tetramethylammonium, the solute was calculated to be $$[(CH_3)_4N]_{2.03}SiO_3$$

The above filtrate, in an amount of 385 ml., was reacted with a solution of 11.1 grams of sodium aluminate dissolved in 32 ml. of water. About 0.2 gram of zeolite ZK-4 was added as seed. After reacting for 3.5 days at 100° C., the mixture was treated as in the initial preparation. The zeolite product sorbed 19.48 grams of water, 11.85 grams of n-hexane and 0.70 gram of cyclohexane per 100 grams of sample. These sorptive capacities are typical of those of zeolite ZK-4.

Analysis of the filtrate from this second preparation showed it to be 2.53 N as a base and to contain 0.966 millimoles of $SiO_2$ per ml. On the basis that all of the basic cation was tetramethylammonium, the solute was calculated to be $[(CH_3)_4N]_{2.03}SiO_3$.

In this latter filtrate, amounting to 360 ml., was dissolved 6 grams of silica gel. The resultant product was reacted with a solution of 10.5 grams of sodium aluminate dissolved in 30 ml. of water. About 0.2 gram of zeolite ZK-4 was added as seed. The resulting mixture was reacted for about 60 hours at 100° C. The zeolite product obtained had the following sorptive capacities based on 100 grams of sample: 20.43 grams of water, 9.40 grams of n-hexane and 0.20 gram of cyclohexane. The lower n-hexane sorptive capacity of this sample compared with those of the previous two samples is indicative of impurity in the zeolite ZK-4 product obtained from this third preparation.

The resulting filtrate was analyzed for sodium and silica and thereafter passed through a column of 100 ml. of zeolite A pellets in the ammonium form. The odor of ammonia was observed in the effluent solution. The effluent solution was found to be 2.05 N as a base. After evaporation under vacuum, the odor of ammonia was not observed and the solution was found to be 2.47 N as a base. This solution was analyzed for sodium and silica. The results of sodium and silica analysis before and after ion exchange in mg. per 10 ml. of solution are shown below:

TABLE I

| | Before exchange | After exchange |
|---|---|---|
| Na | 93.0 | 3.0 |
| $SiO_2$ | 654.0 | 645.0 |

The solute in the ion-exchanged solution corresponded to the formula: $[(CH_3)_4N]_{2.05}SiO_3$.

A zeolite ZK-4 preparation was conducted using this ion-exchanged solution and a solution of 6.1 grams of sodium aluminate dissolved in 17.5 ml. of water. The mixture was seeded as in the previous preparations. After reacting for 28.5 hours at 100° C., the mixture was treated as in the previous preparations. The zeolitic product had the following sorptive capacities per 100 grams of sample: 25.42 grams of water; 13.41 grams of n-hexane and 0.42 gram of cyclohexane. The sorptive capacities, compared with those of the product of the previous preparation, illustrate the improvement in the purity of the zeolite ZK-4 product upon removal of sodium ion from the mother liquor.

Example 2

This example illustrates that removal of ammonia from the ion-exchanged mother liquor is not required for preparation of pure zeolite ZK-4.

A solution was prepared consisting of 9.2 grams of silica gel dissolved in 105 ml. of 2.93 N tetramethylammonium hydroxide solution. Then 3.5 ml. of concentrated amonium hydroxide was added to the silicate to give the same molar ratio of $NH_4/(CH_3)_4N$ as was obtained in the ion-exchange step of the preceding example. The solution was diluted to a total volume of 112 ml. to yield a 2.74 N solution of tetramethylammonium ion. This solution was added to a solution of 3.45 grams of sodium aluminate dissolved in 10 ml. of water. Approximately 0.1 gram of zeolite seed was added to the reaction mixture. After reacting for a period of 16½ hours at 100° C., the mixture was filtered. The zeolite product was washed with water and purged at 350° C. with air. The resulting zeolite had the following sorptive capacities per 100 grams of sample: 23.45 grams of water, 11.1 grams of n-hexane and 0.94 gram of cyclohexane. These capacities are typical of the usual zeolite ZK-4 capacities.

It will be understood that the foregoing description is merely illustrative of preferred embodiments of the invention of which many variations may be made by those skilled in the art within the scope of the following claims without departing from the spirit thereof.

I claim:

1. In a method for making a crystalline zeolite having the composition: 0.1 to 0.3 R:0.7 to $1.0X_2O:Al_2O_3$: 2.5 to 4.0 $SiO_2 \cdot YH_2O$ where R is selected from the group consisting of a methyl ammonium oxide, hydrogen oxide and mixtures thereof with one another; X is selected from the group consisting of sodium and potassium and Y is any value from about 3.5 to about 5.5 wherein the mother liquor remaining after crystallization therefrom of said zeolite contains sodium and tetramethylammonium ions, the improvement which comprises contacting said mother liquor with a zeolitic adsorbent characterized by uniform pore openings of less than 6 angstroms in diameter and having exchangeable cations selected from the group consisting of hydrogen, ammonium and mixtures thereof with one another whereby selective exchange between the sodium ions present in said mother liquor and said cations occurs and employing the sodium depleted mother liquor in further preparation of said zeolite.

2. In a method for making a crystalline zeolite having the composition: 0.1 to 0.3 R:0.7 to $1.0X_2O:Al_2O_3$: 2.5 to 4.0 $SiO_2 \cdot YH_2O$ where R is selected from the group consisting of a methyl ammonium oxide, hydrogen oxide and mixtures thereof with one another; X is selected from the group consisting of sodium and potassium and Y is any value from about 3.5 to about 5.5 wherein the mother liquor remaining after crystallization therefrom of said zeolite contains sodium and tetramethylammonium ions, the improvement which comprises contacting said mother liquor with azeolitic adsorbent containing exchangeable ammonium cations and characterized by uniform pore openings of less than 6 angstroms in diameter whereby exchange between the sodium ions present in said mother liquor and said ammonium cations occurs to the exclusion of said tetramethylammonium ions and employing the resulting sodium depleted mother liquor in further preparation of said zeolite.

3. In a method for synthesizing a crystalline aluminosilicate zeolite having the composition: 0.1 to 0.3 R:0.7 to 1.0X$_2$O:Al$_2$O$_3$: 2.5 to 4.0 SiO$_2$·YH$_2$O where R is selected from the group consisting of a methyl ammonium oxide, hydrogen oxide and mixtures thereof with one another; X is selected from the group consisting of sodium and potassium and Y is any value from about 3.5 to about 5.5 wherein the mother liquor remaining after crystallization therefrom of said zeolite contains sodium and tetramethylammonium ions, the improvement which comprises contacting said mother liquor with a zeolite adsorbent characterized by uniform pore openings within the range of 3 to 6 angrstoms in diameter and having exchangeable cations selected from the group consisting of hydrogen, ammonium and mixtures thereof with one another whereby selective exchange between the sodium ions present in said mother liquor and said cations occurs and reacting the resulting sodium depleted mother liquor with a reagent selected from the group consisting of sodium aluminate and amorphous sodium aluminosilicate gel for further preparation of said zeolite.

References Cited by the Examiner

UNITED STATES PATENTS

| | | | |
|---|---|---|---|
| 2,882,244 | 4/1959 | Milton | 23—12 X |
| 3,071,434 | 1/1963 | Frilette et al. | 23—113 |

MAURICE A. BRINDISI, *Primary Examiner.*